Figure 4:
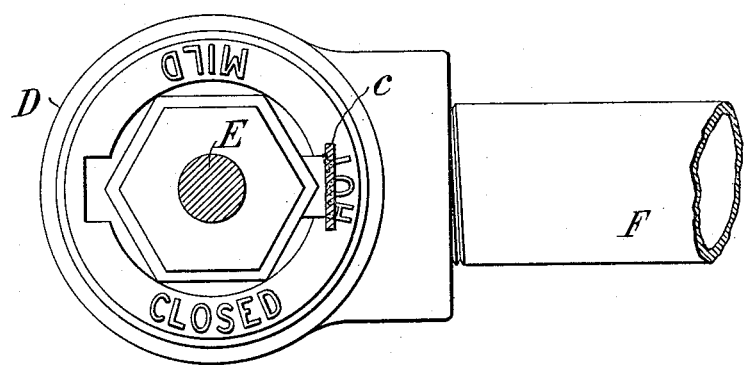

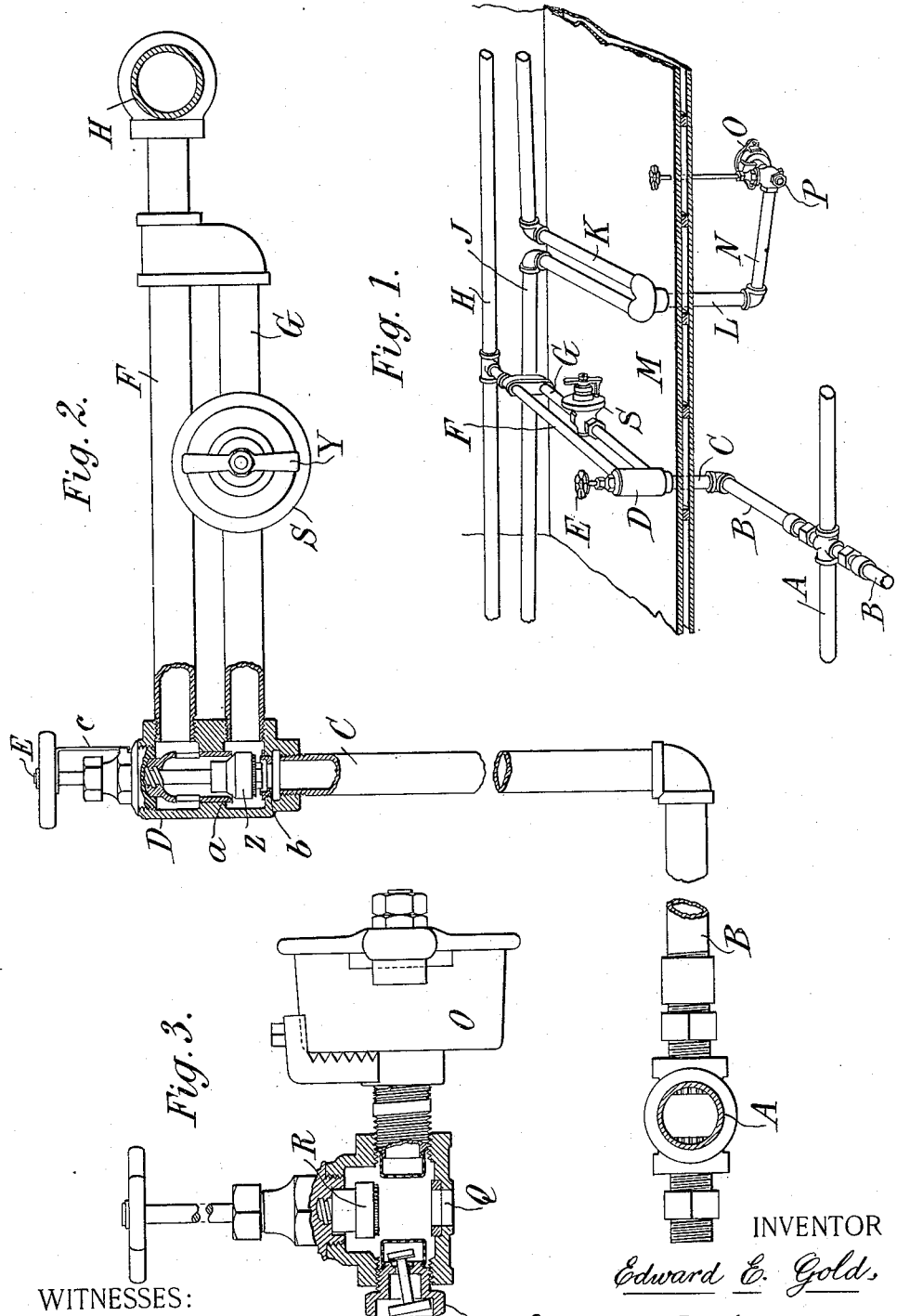

E. E. GOLD.
STEAM HEATING SYSTEM.
APPLICATION FILED FEB. 10, 1910.

1,164,806.

Patented Dec. 21, 1915.
5 SHEETS—SHEET 2.

WITNESSES:

INVENTOR:
Edward E. Gold
By Attorneys,

E. E. GOLD.
STEAM HEATING SYSTEM.
APPLICATION FILED FEB. 10, 1910.
1,164,806.
Patented Dec. 21, 1915.
5 SHEETS—SHEET 4.
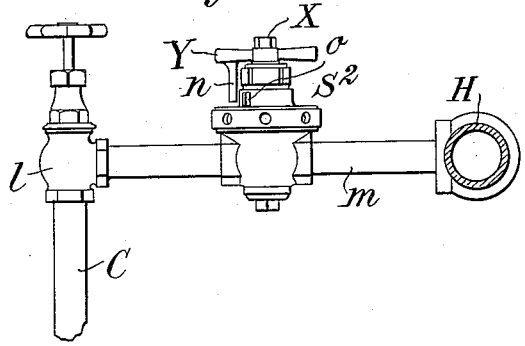
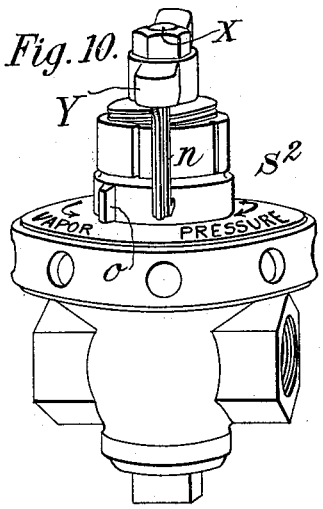
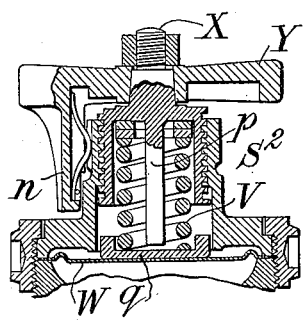
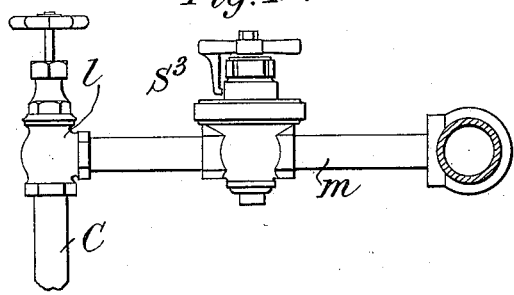
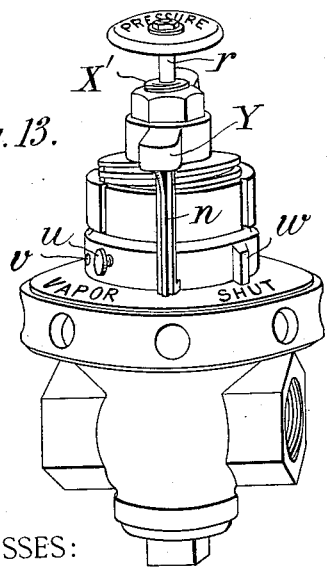
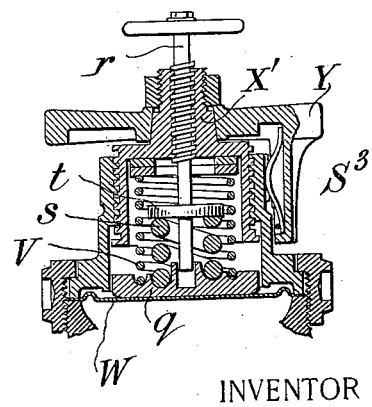
WITNESSES:
René Buine
William F. Martinez
INVENTOR
Edward E. Gold,
By Attorneys,
Arthur C. Fraser & Usina
COLUMBIA PLANOGRAPH CO., WASHINGTON, D. C.

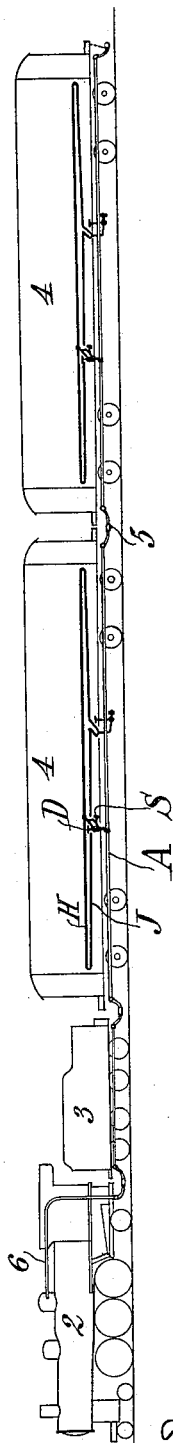

UNITED STATES PATENT OFFICE.

EDWARD E. GOLD, OF NEW YORK, N. Y., ASSIGNOR TO GOLD CAR HEATING & LIGHTING COMPANY, OF NEW YORK, N. Y., A CORPORATION OF NEW YORK.

STEAM-HEATING SYSTEM.

1,164,806.     Specification of Letters Patent.   Patented Dec. 21, 1915.

Application filed February 10, 1910. Serial No. 543,164.

*To all whom it may concern:*

Be it known that I, EDWARD E. GOLD, a citizen of the United States, residing in the borough of Manhattan, city, county, and State of New York, have invented certain new and useful Improvements in Steam-Heating Systems, of which the following is a specification.

In steam heating systems and notably in such systems for heating railway trains there are two important classes. In one, the steam is introduced into the radiator at train pipe pressure or at supply pipe pressure reduced somewhat below that in the train pipe and is maintained or circulated in the radiator at such pressure, the discharge end being normally substantially closed and the water of condensation being discharged intermittently by an automatic trap or continuously through a drip opening having a capacity just about sufficient to carry off the water without allowing the loss of any substantial quantity of steam. This is generally known as the pressure system. Another system is the so-called vapor system in which the radiator is open to the atmosphere at its discharge end, so that the steam in the radiator is at approximately atmospheric pressure; the waste of steam being prevented by thermostatically limiting the supply according to the rate of condensation, the thermostat which controls the supply being located near the discharge end or at some other point in the rear of the admission. There are varieties of these two systems such as a vapor system which circulates also a quantity of air mixed with the steam, and a return pipe system (more commonly used in dwellings than on trains) which returns the water of condensation to the source of steam.

The present invention provides a system which is adapted to be converted at will into a pressure system or into a system operating in effect like the known vapor system, with a continuously open discharge end and a restricted admission.

An important feature is the use of means located between the supply pipe and the radiator for converting the system as desired. Preferably this converting or adjusting means is adapted to be set by hand in either one of two determined positions in one of which the steam is admitted at a higher pressure such as supply pipe pressure, and in the other of which the steam is admitted at a lower pressure, approximately atmospheric pressure. Preferably also the steam is admitted through one or another of a plurality of passages in securing the respective modes of operation, the steam passing to a common admission point of the radiator. A third position of the adjusting means may be provided for, in which position the steam is entirely cut off.

The accompanying drawings illustrate embodiments of the invention.

Figure 5:
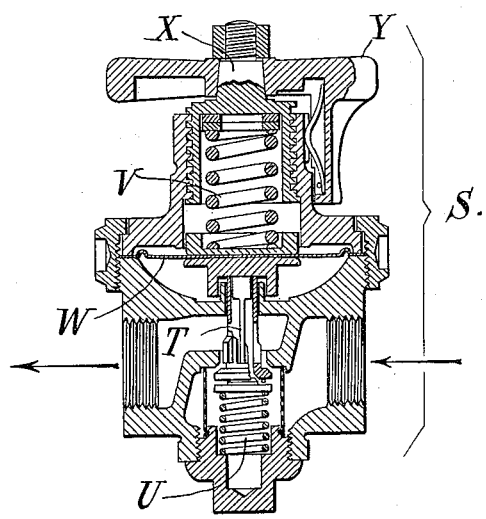
Figure 6:
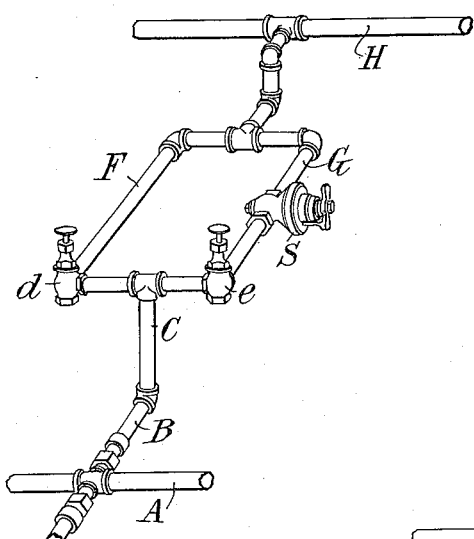
Figure 7:
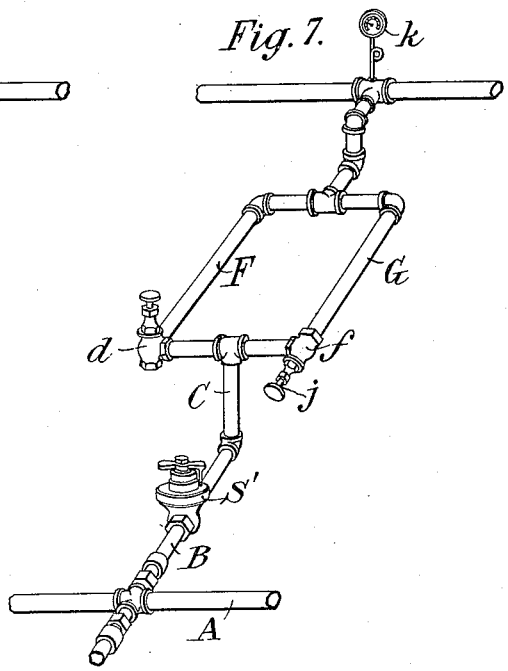
Figure 8:
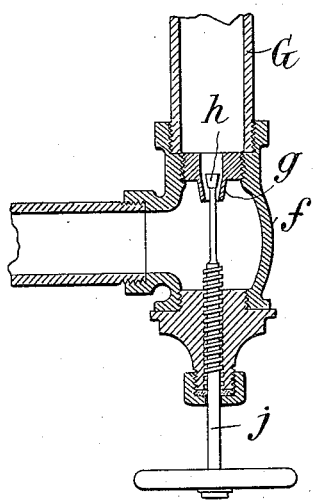

Figure 1 is a perspective view of the principal parts of the system applied to a railway car. Fig. 2 is a cross sectional view on a larger scale of the train pipe and admission pipes of the same system. Fig. 3 is a cross section of the discharge end of the same system. Fig. 4 is a horizontal section of the upper part of the admission valve of Figs. 1 and 2. Fig. 5 is a horizontal section of the pressure reducing valve of Figs. 1 and 2. Figs. 6 and 7 are perspective views of the admission pipes and adjacent parts of other systems embodying the invention. Fig. 8 is a horizontal section of a valve of Fig. 7. Fig. 9 is a side elevation of the admission mechanism of another style. Fig. 10 is a perspective view of a regulating valve of the system shown in Fig. 9. Fig. 11 is a longitudinal section of the upper part of said valve. Fig. 12 is a view similar to Fig. 9 of another style. Fig. 13 is a perspective view of the valve shown in Fig. 12. Fig. 14 is a sectional view of the same valve. Fig. 15 is a diagrammatic side elevation of a train equipped with the heating system shown in detail for a single car in Fig. 1.

Referring to the embodiments of the invention illustrated, the train pipe A is provided with supply branches leading to radiators at opposite sides of the car, said branches being indicated at B each terminating in an upwardly extending pipe C which passes through the floor of the car and carries at its upper end an angle valve indicated as a whole by the letter D and controlled by a stem E. This is a double valve and from it run two supply pipes F and G leading to the radiator which is shown as of a simple type comprising an upper pipe H extending longitudinally along the side of the car and communicating at its ends with a return pipe J provided with a downwardly inclined loop K which communicates through a vertical discharge pipe L passing through the floor M of the car with a slightly inclined discharge pipe N below the floor, at the end of which there are located three outlets. The cross sectional view, Fig. 3, shows these outlets. One outlet is through the automatic trap O of the well-known Gold type in which the escaping steam expands a thermostat and closes the valve, shutting off the escape of steam, whereupon the thermostat is cooled and contracts and opens the valve, allowing the escape of water until the steam again commences to escape and re-closes the valve. Opposite the branch leading to the thermostatic trap is a pressure actuated trap or valve P which is illustrated as of the Gold gravity type. A pressure of a few pounds (say two to five pounds according to the design of the valve) presses the valve firmly against its seat to prevent the escape of steam. When the pressure falls below this minimum, the valve automatically opens, lets in air to break any vacuum formed by the condensation of steam and allows the escape of any water which might otherwise be collected in the pipes. The third outlet Q is a blow-off controlled by a hand valve R having a stem leading up to a point within the car. This is used for clearing out the system of water or dirt by permitting the passage of steam under pressure through the entire system of piping.

The admission of steam is so restricted, in order to operate in effect like the known vapor system, either in quantity or in pressure as not to cause the closing of the pressure valve P at the discharge end, and thus to maintain the steam at approximately atmospheric pressure. This restriction of the steam may be effected for example by means of the adjustable pressure regulating valve indicated as a whole at S. This is a valve provided with a spindle by the turning of which the pressure of the steam admitted into the radiator may be determined. A simple form of it is shown in Fig. 5. The differential valve T has a spring U tending to hold it to its seat and is pressed open by a spring V bearing against a diaphragm W on the under face of which presses the steam at the eduction side of the valve; so that when the steam at the eduction side reaches a determined pressure it releases the differential valve and allows the latter to close. The pressure which will be maintained upon the steam at the eduction side is determined by adjusting the force of the spring V by screwing down the stem X, a handle Y being provided for this purpose and being provided with a pointer at one side which moves over a scale upon the outside face of the casing whereon are indicated the pressures of steam corresponding to the different positions in a single revolution of the spindle. Supposing the pressure valve P at the discharge end of the system to be designed to open at any pressure less than two pounds, then the pressure regulating valve S at the admission end may be set for two pounds and locked or incased to prevent further tampering with it. Or it may be a valve originally designed with the parts in position to limit the pressure to two pounds, and incapable of adjustment. In practice the pressure provided for at the admission end may be slightly in excess of that at which the pressure valve at the discharge end opens, since a part of the pressure is lost in the passage of the steam from the admission to the discharge end. When steam therefore is admitted through the pipe G, the pressure valve and pressure regulator being designed as above, the system will operate substantially as a vapor system, open always to the atmosphere and with little or no loss of steam,— not substantially more for example than escapes through the continuously open drip pipes which are sometimes used with pressure systems.

If the steam is to be used at supply pipe pressure, it is passed through the unrestricted pipe F to the radiator. The passage through the pipe G may be closed or may be left open under these circumstances without altering the operation of the system. The steam under pressure maintains the pressure valve P closed and also closes the thermostatic trap O, the latter opening at intervals to purge the system of water of condensation. The blow-off valve R is closed, except ordinarily at the first heating of a car when the blow-off is held open for a short time to clear out the system.

For directing the steam through the low pressure pipe G or through the high pressure pipe F various valve mechanisms may be employed. In Figs. 1 and 2 the valve D is of a type described and claimed in my previous application No. 533,249. The sectional view of it in Fig. 2 illustrates it sufficiently. It includes a valve body Z having upper and lower seating faces adapted to engage the seats a and b respectively. When in its lowermost position engaging the seat b, the steam is cut off. When in its highest position engaging the seat a steam is admitted only through the low pressure pipe G. When in an intermediate position steam is admitted through the high pressure pipe F (and incidentally into the low pressure pipe). The handle of this valve is provided with a pointer c which as shown in Fig. 4 passes over a marked portion of the outer casing and indicates whether the valve is set to the hot position, the mild position, or the closing position. In the intermediate or hot position the system works under pressure; in the mild position the system works at approximately atmospheric pressure; and in the closed position the steam is, of course, cut off entirely.

Instead of the single valve D used for directing the steam through the unrestricted pipe or through the restricted one, a pair of valves $d$ and $e$ (Fig. 6) may be used of the ordinary angle valve type, the pipes F and G being separated horizontally. Except for the differences noted this sytsem is the same as that shown in Fig. 1.

Fig. 15 shows diagrammatically the arrangement of the apparatus for a complete train. The locomotive and only two cars are shown, but it will be understood that the radiating system will be required for each car, or for any cars, of the complete train. The locomotive is indicated at 2, the tender at 3, and the passenger coaches at 4. The train pipe A passes under the several cars between which it is connected by couplings 5 of any usual or suitable type. The locomotive carries a pipe 6, which forms a continuation of the train pipe and which receives steam from the boiler. In each car there is a radiator indicated by the pipes H and J connected by the branches, shown more fully in Fig. 1, of the train pipe. Fig. 1 and the detailed views corresponding therewith show also more fully the adjustable automatic pressure regulators, the separate discharge pipe for each of the radiators and the discharge valves adapted to close when the regulator is set for a high pressure and to open when the regulator is set for a low pressure.

Instead of a restriction of the pressure at which the steam is admitted, by means of a pressure regulating valve such as S, there may be a restriction of the quantity of steam admitted by means of any suitable obstruction introduced in the passage. The opening through such obstruction may be of fixed area, but preferably is adjustable, as for example by means of a needle valve $f$ (Figs. 7 and 8) which may take the place of the two valves S and $e$ of Fig. 6. A seat $g$ on the inside of this valve has a very small opening in which moves a valve body $h$ which is reciprocated by a stem $j$ passing through the end of the casing. The adjustability of the area of this opening like the adjustability of the admission pressure through the valve S of the previous figures permits of adjusting the system to varying degrees of cold in the atmosphere. But a system providing substantially or approximately the requirements for most conditions of temperature may be secured with a fixed pressure restriction or a fixed area restriction. Where the restriction adopted is of the area or quantity of steam, a pressure regulating valve S' (Fig. 7) may be provided between the train pipe A and the ordinary controlling valves $d$ and $f$, serving to prevent the admission of an excessive pressure in any case. This valve S', like the valve S, may be set permanently for a determined pressure or may be regulatable. In any case it limits the pressure of the supply to the radiator. With this system a pressure gauge $k$ is preferably used near the admission end of the radiator, and this will show at once when the system is closed at the discharge end.

In Figs. 9 to 14 are shown apparatus in which the same result is secured by admitting the steam through a single passage, which passage is restricted or unrestricted according as the system is to be converted into a non-pressure system or into a pressure system. In the mechanism of Fig. 9 two separate valves are required. In that of Fig. 12 a single valve is made to serve the several purposes.

Referring to Fig. 9, the vertical pipe C which passes up through the floor of the car terminates in an ordinary cut-off valve $l$ and a single pipe $m$ conveys the steam to the radiator pipe H. A pressure regulating valve $S^2$ is introduced into the pipe $m$ and, instead of having a single normal position of adjustment as to its arm Y, it is rotatable to bring the depending finger $n$ against either one side or the other of the stop $o$ (Fig. 10). When turned to the right against the stop the system is adapted (the stop valve $l$ being open) to work as a pressure system, the steam flowing without substantial restriction as to pressure from the supply into the radiator. When turned to the left against the stop, the pressure of steam admitted to the radiator is restricted in the manner heretofore described in connection with Figs. 1 and 5 so that the system operates in effect as a vapor system. Intermediate positions are possible, restricting the pressure to intermediate points, but they will not be necessary and will not be ordinarily used. To insure the desired opening of the passage to full pressure and the restriction of it to a determined minimum pressure, the regulator $S^2$ may be constructed as shown in the sectional view, Fig. 11, with a pin $p$ extending downward from the stem X and adapted when the handle Y is turned to the right to bear upon the washer $q$ and the diaphragm W and to force the valve open to the desired extent as the finger $n$ strikes the stop $o$ at one side. When the handle is turned to bring the finger against the other side of the stop there is only the pressure of the spring V to hold the valve open and this is designed of such strength that in the vapor position of the handle the steam will be restricted to the minimum pressure. When the steam is to be cut off entirely the cut-off valve $l$ is operated.

The cut-off valve and the regulating valve of Fig. 9 are combined in one in the regulator $S^3$ of Fig. 12. In this case the main stem $X'$ (Figs. 13 and 14) carries a second stem $r$ which is longitudinally adjustable therein and which extends into the casing in a manner similar to the pin $p$ of Fig. 11. In addition to the other parts of the apparatus which are similar to those in Fig. 11 there is an additional spring $s$ bearing on the washer $q$ and diaphragm W and actuated by a collar $t$ on the stem $r$. The spring V in this construction is made relatively weak compared with the spring $s$. By making this spring so weak as not to press the valve open against the closing pressure of the steam and the spring U (Fig. 5) this regulator serves the same purpose as the two devices of Fig. 9. Adjusting the stem $X'$ to approximately the position shown in Fig. 14 will give a slight pressure over-balancing the closing tendency of the valve by only a few pounds so as to secure a vapor operation. In such a position the finger $n$ will be brought against the stop $u$ (Fig. 13), the latter of which is a stud screwed into any one of a plurality of threaded holes $v$ according to the lower limit of pressure desired. When the arm Y is turned from this position to the left to bring the finger $n$ against the stop $w$, the collar $t$ releases the spring $s$ entirely and the valve will stand shut continually. When the third operation is required, that is to say, operation as a pressure system, the adjusting stem $r$ is screwed down gradually increasing to any desired limit the pressure at which steam is admitted to the radiator or finally at the limit of its downward movement pressing the diaphragm down rigidly and holding the admission valve open so as to secure full supply pipe pressure. Or the valve of Fig. 14 may by a different selection of the springs be used for determining three critical positions (which though they may gradually pass into one another are nevertheless distinct from a practical point of view), a valve $l$ or other stop valve being used in connection therewith for entirely cutting off the steam. In this case the spring V will be of such strength as to secure the operation of the system as a vapor system when the stem $X'$ is raised to its limit. The spring $s$ will be of such strength as to determine the operation of the pressure system at a pressure which is approximately constant and somewhat below that of the supply, and the stem $r$ will be used as before for opening the radiator to full supply pipe pressure when its end engages the washer $q$ and presses the latter downward. Where as is common the train pipe pressure varies from 40 to 80 pounds a spring $s$ might be used which with the stem $r$ in its desired position of adjustment and with the handle Y turned to a suitable limited position will cause the operation of the system as a pressure system under a limit of say 20 pounds; and the spring V might be arranged to give about two pounds pressure with the arm Y turned in the opposite extreme position.

Preferably the pipes F and G of Fig. 1 and the equivalent pipes of the other figures incline downward slightly from the radiator to carry the water of condensation back into the supply pipe. The radiators referred to may be of any type and may supply heat directly to the atmosphere or indirectly through an intermediate circulating body of water or otherwise. Various other known or suitable styles of discharge trap or equivalent mechanism may be used than that shown and various equivalent valves. Where the devices which control the admission of steam to the radiator have their positions of adjustment accurately determined, the system may be operated without use of a pressure gage, and especially where a pressure regulating valve is used. Where a pressure gage is used as with the mechanism of Fig. 7, if the steam enters so fast as to close the discharge trap and create a pressure within the system, the gage will show this fact and the operator can open the blow-off valve or shut the admission valve until the gage shows little or no pressure.

It will be understood that many of the advantages of the invention will result from the operation of the system at approximately atmospheric pressure whether operated with the discharge end continuously open to the atmosphere or not. For example the pressure may be maintained as low as five pounds at the entrance to the radiator, and though the trap may occasionally close yet there will be no substantial difference in the amount of steam consumed as compared with operating with the discharge end continuously open; and the aggregate period during which the discharge end will remain open approximates a continuously open condition. Instead of the steam $p$ and $r$ shown in Figs. 11 and 14, various other means may be utilized for effecting a rigid holding of the valve open.

By suitably proportioning the valve $f$ (Fig. 7) to give a free passage when open as well as a nicely adjustable restricted passage when nearly closed and to secure a good closure when the valve is turned to the cut-off position, the pipe F may be omitted, thus using a single passage, substantially unrestricted for pressure operation and restricted as to area or quantity of steam when set to the proper point for vapor operation. It is preferable, though not essential, to use the pressure regulator S' with such a system and also the steam gage k for determining how the system is working at any time, whether in effect as a vapor or as a pressure system.

Instead of relying upon the automatic opening of the pressure trap to secure a vapor operation, the blow-off valve R may be manually opened and left open for that purpose. This may be done in the case of any of the supply mechanisms above referred to. By leaving the blow-off valve open and admitting steam under accurately regulated restriction as to quantity or pressure, the radiator pipes may be kept continuously supplied with low pressure steam in just sufficient quantity to approximately make good the condensation. The needle valve f (Fig. 7) for example, might be opened a suitable distance to maintain a minimum supply.

I claim as my invention:—

1. A steam heating system including dual discharge controlling means, automatic admission controlling means disconnected therefrom but operatively related thereto and means adapted to be set by hand in either of two determined positions, one of said positions causing the discharge of steam continuously at approximately atmospheric pressure and the other causing the admission and maintenance of steam in the radiator at a higher pressure.

2. A steam heating system including a radiator, a supply pipe, a plurality of passages being provided between said supply pipe and said radiator, controlling means including a pressure reducing valve in one of said passages for determining the pressure at which steam is admitted therethrough, and including means in advance of said passages adapted to admit steam from the supply pipe to said passages and adapted, while admitting steam to the passage containing the pressure-reducing valve, to prevent the admission of steam to the other passage.

3. A steam heating system including a radiator, a supply pipe, a plurality of passages being provided between said supply pipe and said radiator, a common admission valve for said passages, said valve having two determined positions in one of which steam is admitted through one of said passages and in the other of which steam is admitted through the other of said passages and means for restricting the admission of steam through one of said passages.

4. A steam heating system including a radiator having a single admission port and a discharge port, means for closing said discharge port to maintain pressure in the radiator and for purging the radiator of water of condensation, a supply pipe, a plurality of passages being provided between said supply pipe and said admission port, controlling means for said plurality of passages including a pressure reducing valve in one of said passages, and including means in advance of said passages adapted to admit steam from the supply pipe to said passages and adapted, while admitting steam to the passage containing the pressure-reducing valve, to prevent the admission of steam to the other passage.

5. A steam heating system including a radiator, a supply pipe, a plurality of pipes between said supply pipe and said radiator, one of said pipes providing an unrestricted passage, a pressure reducing valve in another of said pipes, means in advance of said plurality of pipes for putting said supply pipe into communication with said radiator through said passage containing the reducing valve alone or through said unrestricted passage at will and for closing both said passages and preventing communication therethrough, and means for maintaining the discharge end of the radiator normally closed to maintain supply pipe pressure therein when the supply is unrestricted.

6. A steam heating system including a radiator having a discharge port, means for closing said discharge port to maintain pressure in the radiator and for purging the radiator of water of condensation, a supply pipe, a plurality of pipes between said supply pipe and said radiator, one of said pipes carrying a valve automatically controlled by the pressure in its pipe for restricting the passage of steam therethrough and the other providing an unrestricted passage, and means for putting said supply pipe into communication with said radiator through only said pipe carrying the pressure reducing means or through said pipe providing an unrestricted passage.

7. A steam heating system including a radiator, a supply pipe, and pressure-controlling regulating means between said supply pipe and said radiator for admitting steam unrestrictedly or restrictedly under automatic control of the pressure on its eduction side or for cutting off the steam, at will.

8. A steam heating system including a radiator, a supply pipe, and valve mechanism between said supply pipe and said radiator comprising pressure - reducing means and adapted to be set in position to admit steam unrestrictedly and to be set in position to admit steam only restrictedly under automatic control of the pressure on its eduction side.

9. A steam heating system including a radiator, a supply pipe, and valve mechanism between said supply pipe and said radiator comprising pressure - reducing means and adapted to be set in three positions, one admitting steam unrestrictedly, another admitting steam restrictedly under automatic control of the pressure on its eduction side, and another cutting off the steam.

10. A steam heating system for railway cars including a radiator on the car, a train-pipe extending from end to end on the car and adapted for connection with adjacent cars, said radiator having a discharge end which is disconnected from the train-pipe and discharges into the atmosphere, and mechanism for causing the system to operate with a normally closed discharge end or with a continuously open discharge end, said mechanism including discharge-controlling means and means between the train-pipe and the radiator and disconnected from but operatively related to said discharge-controlling means for determining in combination therewith whether the system shall operate with the normally closed or with the continuously open discharge end.

11. A steam heating system including in combination a supply pipe, a radiator, means between said supply pipe and said radiator adapted to be set in positions for restricting the steam admitted to said radiator, or admitting it unrestrictedly at will, said means including a pressure regulator, and means disconnected from the pressure regulator for opening the discharge automatically when the steam is admitted restrictedly and for substantially closing the discharge automatically when steam is admitted without such restriction, and a pressure gage communicating with the radiator.

12. A steam heating system including in combination a supply pipe, a radiator, admission controling means adapted to be set in positions for restricting the steam admitted to said radiator or admitting it unrestrictedly at will, means disconnected from but operatively related to said admission controlling means for opening the discharge automatically when the steam is admitted restrictedly, and for substantially closing the discharge automatically when steam is admitted without such restriction, and a pressure gage showing the pressure in said radiator.

13. A steam heating system for a railway train, including in combination a source of steam under comparatively high but variable pressure, a train pipe, a pressure reducing valve admitting steam at reduced pressure from said source to said train pipe, radiating pipes in the separate cars connected to successive points of the train pipe, means for controlling the pressure and admission of steam into the radiating pipes of each car separately, and means for opening said radiating pipes near their discharge end automatically when the pressure of steam falls below a determined minimum within the range of pressures determined by said controlling means.

14. A steam heating system including a radiator, means for admitting steam thereto automatically controlled by the steam at the admission end of the radiator, non-automatic means for admitting steam thereto, and means for automatically providing a free discharge from said radiator when said automatically controlled means is operative.

In witness whereof I have hereunto signed my name in the presence of two subscribing witnesses.

EDWARD E. GOLD.

Witnesses:
D. ANTHONY USINA,
FRED WHITE.

Copies of this patent may be obtained for five cents each, by addressing the "Commissioner of Patents, Washington, D. C."